US008976667B1

(12) United States Patent
Dropps (10) Patent No.: US 8,976,667 B1
(45) Date of Patent: Mar. 10, 2015

(54) METHOD AND SYSTEM FOR PROGRAMMABLE DELAY BEFORE TRANSMISSION PAUSING

(71) Applicant: QLOGIC, Corporation, Aliso Viejo, CA (US)

(72) Inventor: Frank R. Dropps, Maple Grove, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 322 days.

(21) Appl. No.: 13/678,145

(22) Filed: Nov. 15, 2012

(51) Int. Cl.
*G01R 31/08* (2006.01)
*H04L 12/835* (2013.01)

(52) U.S. Cl.
CPC .................................. *H04L 47/30* (2013.01)
USPC .......................................... 370/236; 370/235

(58) Field of Classification Search
CPC ....... H04L 47/10; H04L 47/266; H04L 47/11; H04L 47/24; H04L 47/2433
USPC .......................................................... 370/235
See application file for complete search history.

(56) References Cited

U.S. PATENT DOCUMENTS

| | | | |
|---|---|---|---|
| 2007/0206496 A1* | 9/2007 | Roy et al. ....................... | 370/229 |
| 2008/0232251 A1* | 9/2008 | Hirayama et al. ............. | 370/235 |
| 2012/0269065 A1* | 10/2012 | Godbole et al. .............. | 370/235 |
| 2013/0250760 A1* | 9/2013 | Sela et al. ..................... | 370/231 |

* cited by examiner

*Primary Examiner* — Jutai Kao
(74) *Attorney, Agent, or Firm* — Klein, O'Neil & Singh, LLP (57) ABSTRACT

Method and system for maximizing data transmission between a first network device and a second network device connected to a network, is provided. A data transmission pause request received from a port of the first network device by a port of the second network device. The process then determines if the first network device's port can receive additional data; and transmits additional data to the first network device from the second network device if the first network device's port can receive additional data.

19 Claims, 6 Drawing Sheets

METHOD AND SYSTEM FOR PROGRAMMABLE DELAY BEFORE TRANSMISSION PAUSING

BACKGROUND

1. Technical Field

The present disclosure relates to networks and more particularly, to network devices.

2. Related Art

Networking systems are commonly used to move network information (which may also be referred to interchangeably, as frames, packets or commands) between computing systems (for example, servers) or between computing systems and network devices (for example, storage systems). Various hardware and software components are used to implement network communication.

A network switch is typically a multi-port device where each port manages a point-to-point connection between itself and an attached system. Each port can be attached to a server, peripheral, input/output subsystem, bridge, hub, router, or another switch where each of the aforementioned network devices also has one or more ports. The term network switch as used herein includes a Multi-Level switch that uses plural switching elements within a single switch chassis to route data packets. Different network and storage protocols may be used to handle network information and storage information. Continuous efforts are being made to enhance the use of networking and storage protocols in network devices.

SUMMARY

In one embodiment, a method for maximizing data transmission between a first network device and a second network device connected via a network, prior to a transmission pause is provided. The method includes: receiving a data transmission pause request from a port of the first network device at a port of the second network device; determining if the port of the first network device can receive additional data; and delaying transmission pause and transmitting additional data to the first network device from the second network device if the port of the first network device can receive additional data.

In an additional embodiment, a system for maximizing data transmission is provided. The system includes a first network device coupled to a network; and a second network device coupled to the network. The second network device receives a data transmission pause request from the first network device and determines if the first network device can receive additional data within a fixed quanta, based on a determination of remaining capacity in a receive buffer of the first network device. The second network device implements the transmission pause request within the fixed quanta but transmits additional data to the first network device when there is remaining capacity in the receive buffer.

In yet another embodiment, a network device coupled to a network via a network link is provided. The network device includes a processor for executing firmware code; and a port for receiving and transmitting frames. The network device receives a data transmission pause request from a destination network device and determines if the destination network device can receive additional data within a fixed quanta, based on a determination of remaining capacity in a receive buffer of the destination network device. The network device implements the transmission pause request within the fixed quanta but transmits additional data to the destination network device when there is remaining capacity in the receive buffer.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The various present embodiments now will be discussed in detail with an emphasis on highlighting the advantageous features with reference to the drawings of various embodiments. The illustrated embodiments are intended to illustrate, but not to limit the invention. These drawings include the following figures, in which like numerals indicate like parts:

FIG. 1 is a functional block diagram of a network that the present embodiments may be used in connection with;

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g. CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of non-transitory storage devices (magnetic, optical, static, etc.).

The embodiments disclosed herein, may be implemented as a computer process (method), a computing system, or as an article of manufacture, such as a computer program product or non-transitory computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

Various network standards and protocols may be used to enable network communications using the disclosed embodiments, including Fibre Channel (FC), Fibre Channel over Ethernet (FCoE), Ethernet, and others. Below is a brief introduction to some of these standards. The present embodiments are described herein with reference to the Fibre Channel, FCoE and Ethernet protocols. However, these protocols are used merely for ease of reference and to provide examples. The present embodiments are not limited to Fibre Channel, FCoE and Ethernet.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches (or other devices, for example, adapters) use memory buffers to temporarily hold frames that are received and sent across a network. Associated with these buffers are credits, which are the number of frames that a buffer can hold per Fabric port.

Fibre Channel devices use the concept of "credits" for managing flow control when sending and receiving information. Typically, before a transmit port can transmit frames, a receiving port sends credit to the transmitting port indicating the number of frames that the receiving port can hold. The credits are based on the space that may be available at the receiving port, at any given time. Thus the transmitting port is only permitted to transmit frames when it has the necessary credits from the receiving port. This prevents situations where the receiving port may overflow with received frames.

Fibre Channel ports use special primitives for providing credits. One such primitive is called an R-RDY that is used by a receiving port to grant credit to a transmit port. Another primitive is a VC_RDY primitive that is used when the receiving port is configured to use virtual lanes (or virtual circuits). Details regarding the use of R-RDYs and VC_RDYs are not germane to the adaptive embodiments disclosed herein.

Ethernet is a family of computer networking technologies for local area networks (LANs). Systems communicating over Ethernet divide a stream of data into individual packets called frames. Each frame contains source and destination addresses and error-checking data so that damaged data can be detected and re-transmitted. Ethernet is standardized in IEEE 802.3, which is incorporated herein by reference in its entirety.

Ethernet uses "Pause" frames for managing flow control. In Ethernet, a receive buffer may send a Pause frame indicating to the transmitting Ethernet port that it cannot receive a frame. Thus in this case, implicitly, the transmitting port is out of credit.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

Figure 1:
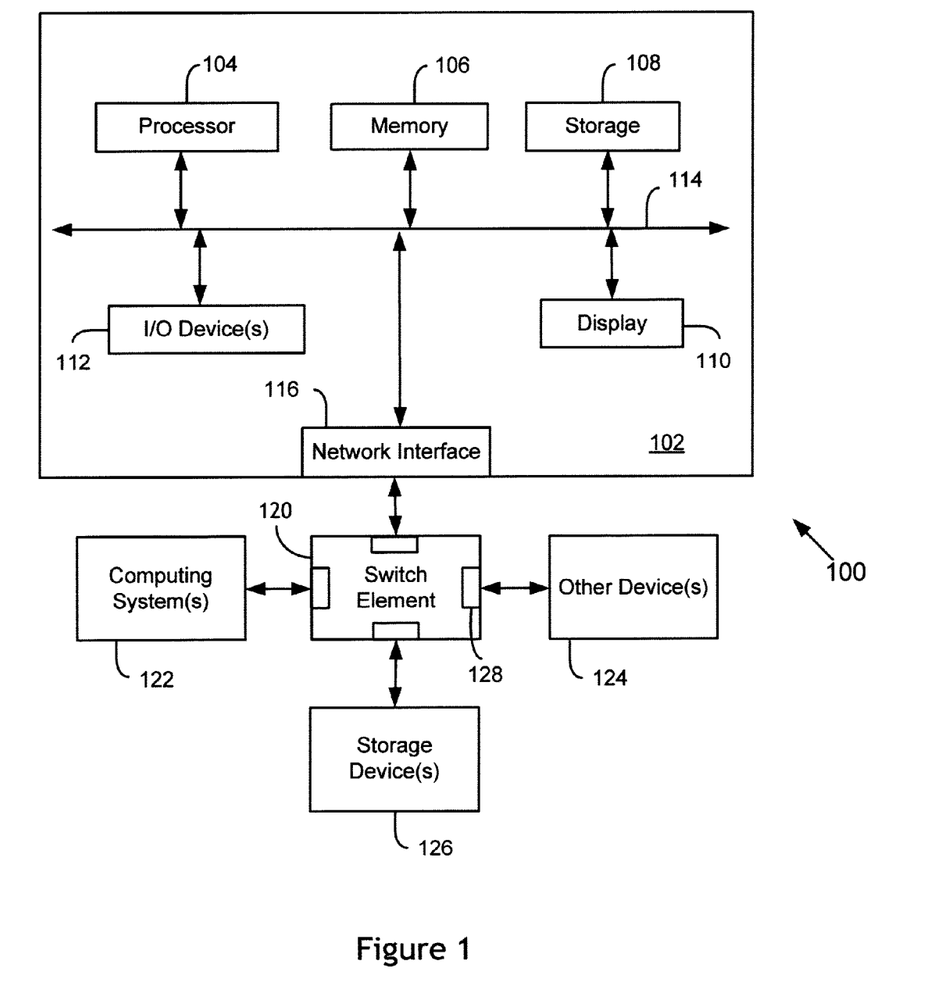

FIG. 1 shows an example of a system 100 that may be used in connection with the present embodiments. System 100 may include a computing system 102, which may be referred to as a host system. A typical host system 102 includes several functional components, including a central processing unit (CPU) (also referred to as a processor or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch element 120 and various links. The network interface 116 may comprise a network interface card (NIC) or any other device for facilitating communication between the host system 102, other computing systems 122, storage devices 126, and other devices 124. The network interface 116 may include a converged network adapter, such as that provided by QLogic Corporation for processing information complying with storage and network protocols, for example, Fibre Channel and Ethernet. As an example, the network interface 116 may be an FCoE adapter. In another embodiment, the network interface 116 may be a host bus adapter, for example, a Fibre Channel host bus adapter, such as that provided by QLogic Corporation. Details regarding the network interface 116 are not provided since they are not germane to the inventive embodiments described herein.

The processor 104 of the host system 102 may execute various applications, for example, an e-mail server application, databases, and other application types. Data for various applications may be shared between the computing systems 122 and stored at the storage devices 126. Information may be sent via switch 120 ports. The term "port" as used herein includes logic and circuitry for receiving, processing, and transmitting information.

Each device (e.g. the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device, e.g. network interface 116 for the host system 102 and an interface (not shown) for the storage devices 126. Fabric ports are typically located in Fabric devices, such as the switch element 120. Details regarding the switch element 120 are provided below.

Figure 2A:
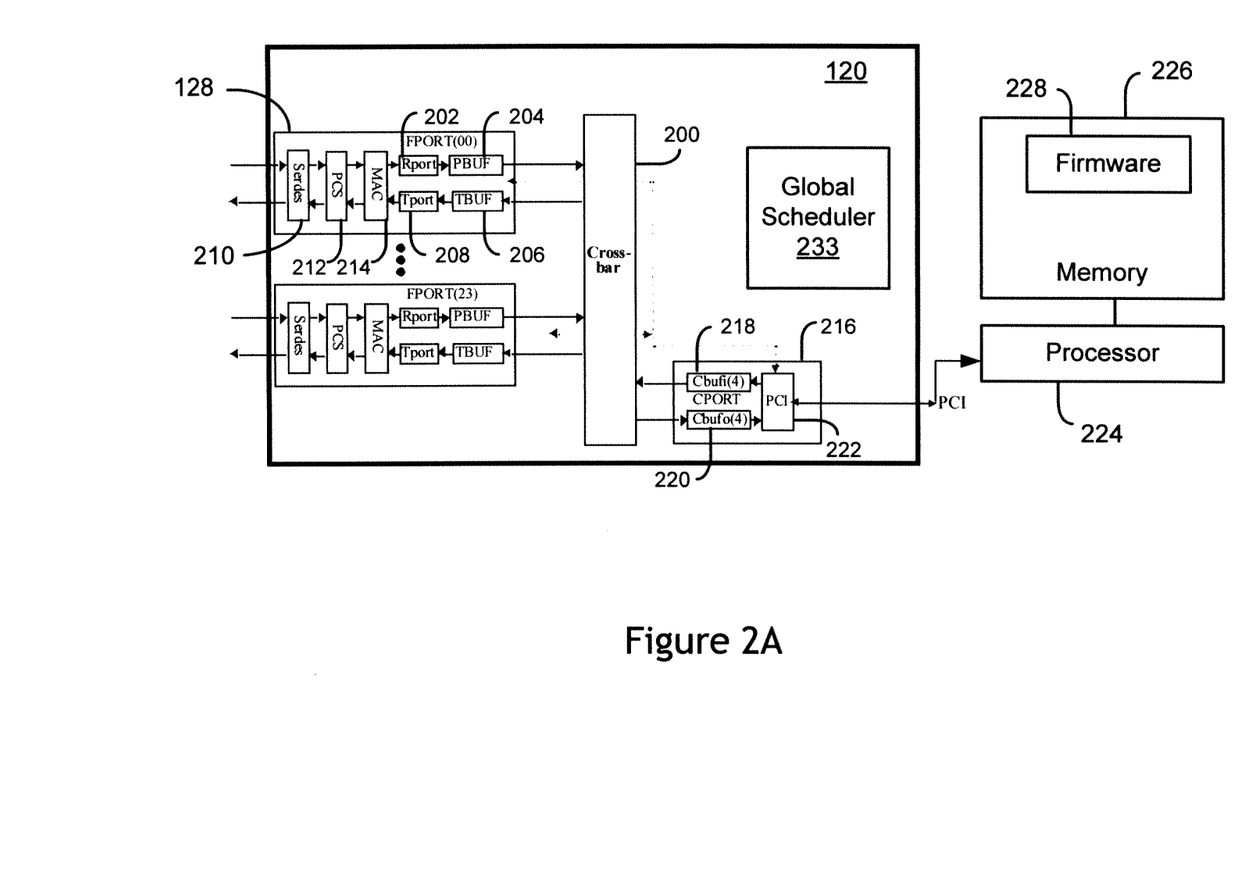
FIG. 2A is a functional block diagram of a switch element according to the present embodiments.

FIG. 2A is a high-level block diagram of switch element 120, also referred to as the switch 120. Switch element 120 may be implemented as an application specific integrated circuit (ASIC) having a plurality of ports 128. Ports 128 are generic (GL) ports and may include an N_Port, F_Port, FL_Port, E-Port, or any other port type. The ports 128 may be configured to operate as Fibre Channel, FCoE or Ethernet ports. In other words, depending upon what it is attached to, each GL port can function as any type of port. As an example, ports 128 of FIG. 2A are drawn on the same side of the switch element 120. However, the ports 128 may be located on any or all sides of switch element 120. This does not imply any difference in port or ASIC design. The actual physical layout of the ports will depend on the physical layout of the ASIC.

Ports 128 communicate via a time shared crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate the ports 128 plus a control port (CPORT) 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared, time multiplexed pipeline for receiving frames (or information). The pipeline includes a serializer/deserializer (SERDES) 210, a physical coding sub-layer (PCS) 212, and a time multiplexed media access control (MAC) sub-layer 214. The SERDES 210 receives incoming serial data and converts it to parallel data. The parallel data is then sent to the PCS 212 and the MAC 214 before being sent to a receive segment (or receive port (RPORT) 202).

The RPORT 202 temporarily stores received frames at a memory storage device, shown as PBUF (pause buffer) 204. The frames are then sent to a transmit segment (or transmit port (TPORT)) 208 via the crossbar 200. The TPORT 208 includes a memory device shown as a transmit buffer (TBUF) 206. The TBUF 206 may be used to stage frames or information related to frames before being transmitted. The TPORT 208 may share the MAC 214 and the PCS 212 with the RPORT 202. The SERDES 210 at TPORT 208 is used to convert parallel data into a serial stream (the SERDES 210 may also be shared with the RPORT 202).

The switch element 120 may also include the control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 may be used to store firmware instructions 228 for controlling switch element 120 operations.

The CPORT 216 includes an input buffer (CBUFI) 218, which is used to transmit frames from the processor 224 to the ports 128. The CPORT 216 further includes an output buffer (CBUFO) 220, which is used to send frames from the PBUFs 204, the TBUFs 206, and CBUFI 218 that are destined to processor 224.

Port 128 described above may be referred to as a "base-port" that may have more than one network link available for receiving and transmitting information. Each network link allows the base-port to be configured into a plurality of independently operating sub-ports, each uniquely identified for receiving and sending frames. The sub-port configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, 1 double lane Ethernet port and two single lane Ethernet ports, one double lane Ethernet port, one single lane Ethernet port and one single lane Fibre Channel port, one double lane Ethernet port and two single lane Fibre Channel port, one four lane Ethernet port or one four lane Fibre Channel port. Port 128 uses some logic that is shared among the multiple sub-ports and some logic that is dedicated to each sub-port.

Figure 2B:
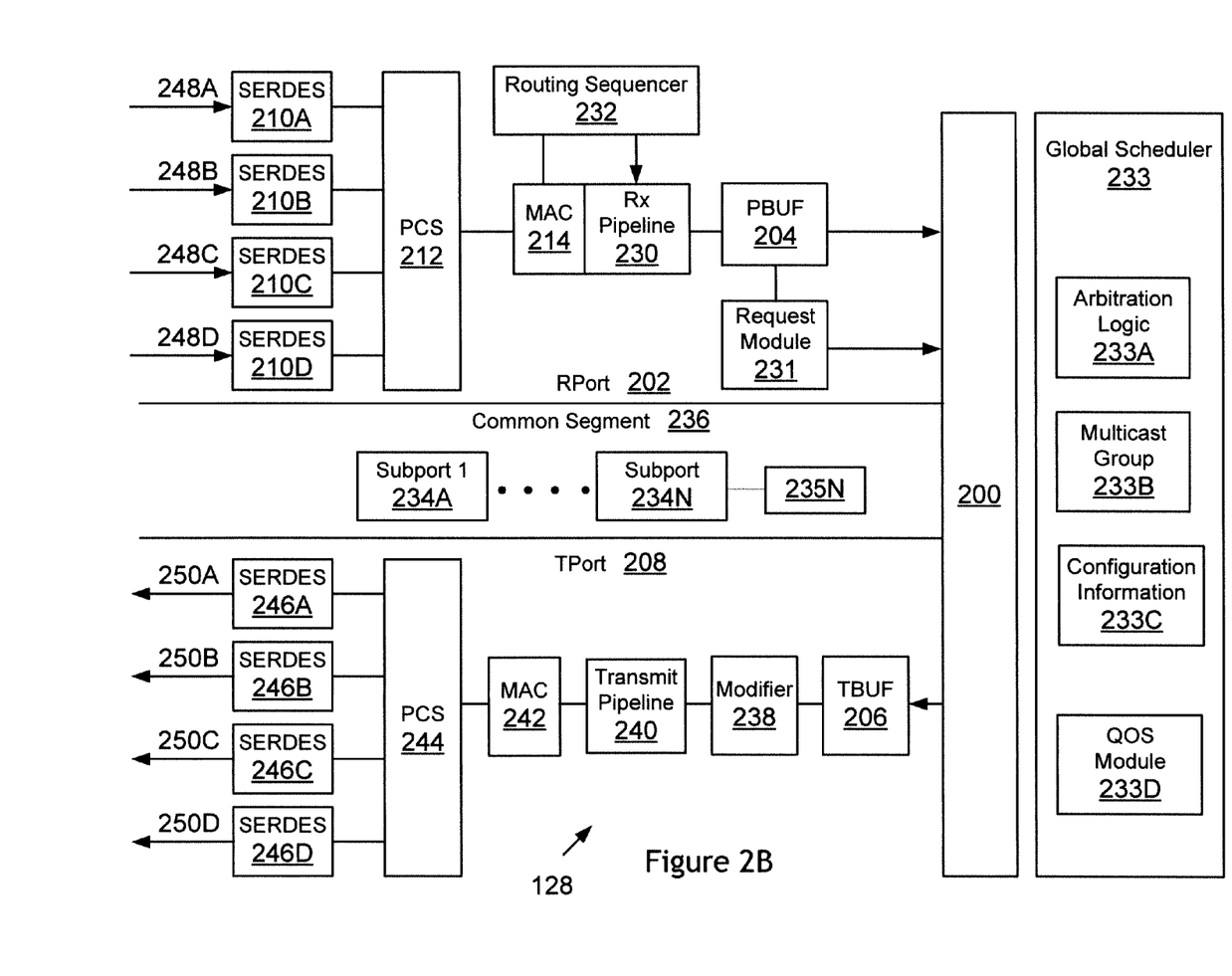
FIG. 2B shows a block diagram of a port, according to one embodiment.

FIG. 2B shows an example of base-port 128 having RPORT 202, TPORT 208 and a common segment 236, according to one embodiment. RPORT 202 is used for receiving and processing frames, while TPORT 208 is used for transmitting frames. Common segment 236 is used to store information that may be commonly used among different components of base-port 128. In one embodiment, base-port 128 may be configured to include a plurality of independent sub-ports. The configuration information/logic 234A-234N for each sub-port may be stored in common segment 236.

RPORT 202 may include or have access to a plurality of network links (or lanes), for example, four independent physical network links 248A-248D, each configured to operate as a portion of an independent sub-port within base-port 128. Each network link is coupled to a SERDES 210-210D that share PCS 212 and MAC 214. The multiple lanes also share a receive pipeline (Rx pipeline) 230 that is used for pre-processing received frames before they are transferred. Both MAC 214 and receive pipelines 230 are time multiplexed so that they can be shared among the plurality of links based on how the ports are configured to operate. It is noteworthy that receive pipeline 230 may include MAC 214 and PCS 212.

Incoming frames are received via one of the network links 248A-248D. The received frame is processed by the appropriate SERDES 210A-210D and then sent to the PCS 212. As the PCS 212 continues to process the frame, the frame is provide to MAC 214 that is time shared among a plurality of sub-ports. This means that for a certain time segment (for example, one or more clock cycles), MAC 214 may be used by one of the sub-ports. After the MAC module 214 processes the frame, the frame is sent to receive pipeline 230 that is also time shared. Information regarding the frame or a copy of the frame is also provided to a routing sequencer 232 that determines the destination of the received packets.

In one embodiment, a frame whose destination is processor 224 is given the highest priority, followed by a frame that is routed by a TCAM (ternary content addressable memory) or steering registers located within a routing sequencer 232. It is noteworthy that more than one routing sequencer may be used for each base-port 128. Frames that are ready to be sent out are then staged at PBUF 204. PBUF 204 may have a plurality of queues that may be referred to as receive queues (or receive buffers). The receive queues temporarily store frames, until a request to move the frame is granted.

When a sub-port is configured to operate as a Fibre Channel port, then credit is issued by the sub-port based on the space that is available at PBUF 204. The term credit as used herein means that a receiving port has space available for storing certain amount of information. The sub-port issues R_RDYs or VC_RDYs depending on whether virtual lanes are being used at any given time. When a sub-port is configured to operate as an Ethernet port, credit information based on the space that is available in a receive data buffer (PBUF 204) is conveyed through the transmission of pause frames.

To move frames from the receive queues; a request module 231 generates requests for a global scheduler 233, also referred to as scheduler 233. Request module 231 maintains a data structure (not shown) that tracks a number of requests that may be pending for each sub-port. Request module 231 also removes requests from the data structure when a grant is received for a particular request.

Scheduler 233 stores configuration information 233C for various ports and some of that information may be used to select requests. Scheduler 233 includes arbitration logic 233A that performs dual stage arbitration for requests from various base-ports. Scheduler 233 also maintains a data structure at a memory labeled as multicast group 233B. The data structure stores information for identifying multicast groups that may receive multicast frames (i.e., frames that are destined to multiple destinations). Scheduler 233 uses the information for processing requests that involve multicast frames.

Scheduler 233 further includes a quality of service (QOS) module 233D that monitors QOS data.

Frames for transmission via TPORT 208 move via TBUF 206 and a modifier 238. In one embodiment, modifier 238 may be used to insert, modified or remove information from an outgoing frame. The modification is based on the frame type and transmit virtual queue. The time shared transmit pipeline 240 and MAC 242 are used to process outgoing frames. PCS 244, SERDES 246A-246D are used similar to PCS 212 and SERDES 210A-210D. Network links 250A-250D are similar to links 248A-248D, except links 250A-250D are used to transmit frames. It is noteworthy that although separate PCS and MAC have been shown for RPORT 202 and TPORT 208, some of the same PCS 212 and MAC 214 logic may be shared and used in the receive and transmit paths, as seen in FIG. 2A.

Figure 2C:
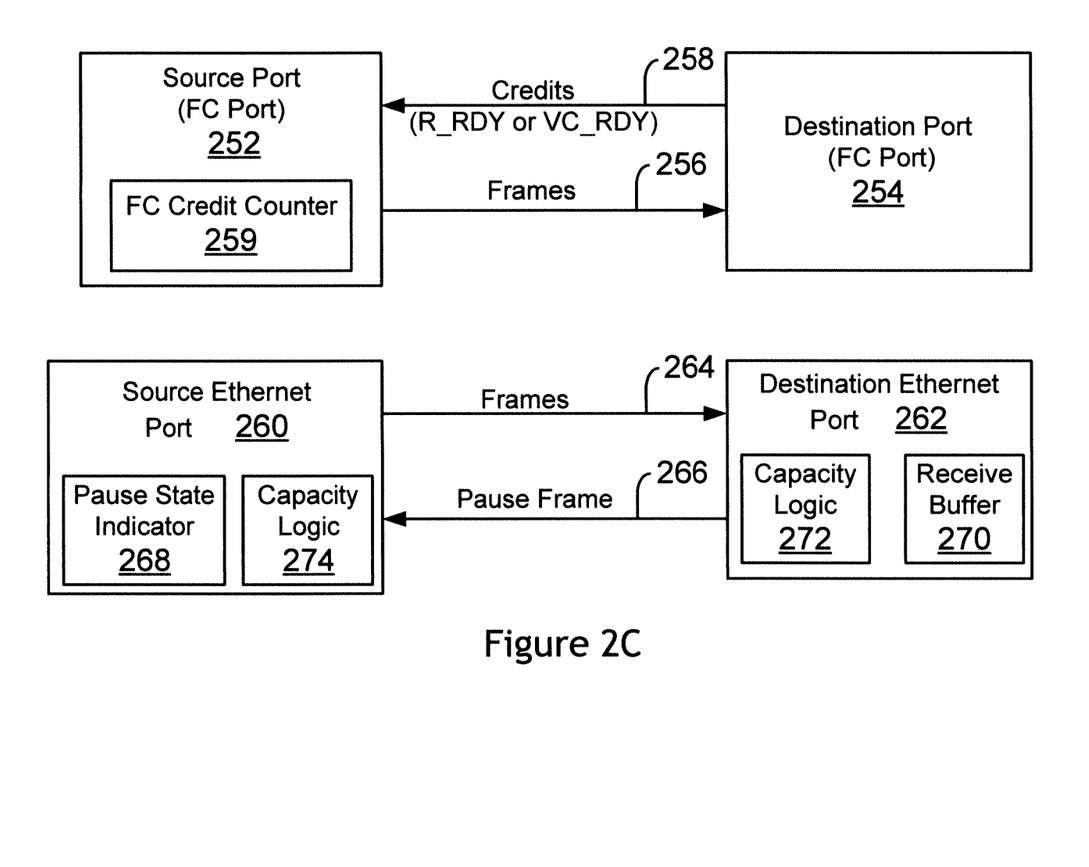
FIG. 2C shows a block diagram of how credit is used between communicating ports (or sub-ports), according to one embodiment.

FIG. 2C shows an example of how credit is used between communicating ports (or sub-ports). In the first example, a port 252 (similar to port 128 or a sub-port within base-port 128) configured to operate as a Fibre Channel port is the transmitting port or the source port. The destination port (or the receiving port) 254 sends credits (R-RDY or VC_RDY primitives) 258 indicating to port 252 that it can receive frames (packets or information) 256. The source port 252 maintains a Fibre Channel credit counter 259 that is decreased, every time a frame is sent to port 254. When counter 259 becomes zero, it indicates that port 252 no longer has available credit to transmit frames to port 254. Counter 259 may be at a receive segment (or RPORT 202) of port 252.

The second example shows a transmitting or a source Ethernet port 260 configured to transmit frames 264 to a receiving or destination port 262. The source and destination ports may be a base-port 128 or a sub-port. Ethernet flow control operation in network devices functions by having the destination port 262 transmit a pause frame (i.e., a transmission pause) back to the source port 260 once a receive buffer 270 (similar to PBUF 204) of the destination port 262 reaches a threshold of its capacity. The destination port 262 uses a capacity logic 272 to determine if the capacity of the receive buffer 270 has reached threshold. The capacity logic 272 may be a part of a write control module (not shown) that manages writes to the receive buffer.

When the destination port 262 determines that it cannot receive any more frames 264 because the capacity logic 272 has determined that the receive buffer 270 is at or near threshold capacity, it sends out a transmission pause or pause frame 266 to the source port 260. The format of the pause frame 266 complies with the Ethernet standards, the details of which are not germane to inventive embodiments. This indicates to the source port 260 that it no longer has credit to send frames to the destination port 262. The source port 260 may maintain a Pause status indicator 268 at a register in a common segment or otherwise.

As mentioned above, the pause frame 266 implicitly indicates that the destination port 262 is out of receive credit and the source port 260 is out of transmit credit. Destination port 262 has determined that the receive buffer 270 has reached threshold capacity indicating that the receive buffer 270 is either full or will shortly become full. The threshold capacity of the receive buffer 270 is either fixed or programmable. According to the current Ethernet standard, once the source port 260 receives the pause frame 266, the source port 260 has a fixed period of time before the source port 260 has to stop transmitting frames. This time is set in quanta (i.e., the time required to transmit 512 bits on the wire or link between the source port 260 and the destination port 262). The allowed time accounts for the possibility that there is already data on the link between the source port 260 and the destination port 262 and/or that the transmitter on the source port 260 has just started the transmission of a jumbo packet which may be as large as 10,240 bytes long. The source port 260 and the destination port 262 may be two ports on the same network device or on separate network devices connected over a network link.

The determination by capacity logic 272 that the receive buffer 270 has reached threshold capacity is based on any one or more assumptions. For example, the determination can be based on an assumption by the capacity logic 272 that there are already frames 264 on the link coming to the destination port 262 and/or that the source port 260 has just started the transmission of a jumbo packet. However, only the source port 260 is aware of how much data is actually already on the link heading towards the destination port 262, if the source port 260 started the transmission of a jumbo packet, and/or how much more data is still left in a transmit buffer of the source port 260 to send to the destination port 262. The assumption(s) by the capacity logic 272 can be flawed because there may not be frames 264 already on the link heading towards the destination port 262, the source port 260 may not have just started the transmission of a jumbo packet, etc. In other words, a pause frame 266 can be sent out by the receive buffer 270 based on erroneous assumptions by the capacity logic 272, such as those discussed above. The assumptions by the capacity logic 272 can result in the transmission of data from the source port 260 ending too soon and the receive buffer 270 not being fully utilized (i.e., data transmission ends while there is still more room in the receive buffer 270 for additional data before the receive buffer 270 is completely full).

Under the current Ethernet standard, after receiving a pause frame 266, the source port 260 will cease data transmission as soon as it can (i.e. at the end of the frame currently being transmitted because the source port 260 cannot stop transmitting in the middle of a frame, only at the end of a frame). The source port 260 may also include remaining buffer capacity calculation logic 274 in TPORT 208 that tracks how many bytes of data have been transmitted over the past time interval. This time interval would be a calculation of the time data takes to travel from the source port to the destination port across the link. This remaining buffer capacity calculation logic 274 provides for determining whether or not the source port 260 can send additional data to the receive buffer 270 without causing the receive buffer 270 to overflow.

When the source port 260 receives a transmission pause frame 266 from the destination port 262, the source port 260 uses the remaining buffer capacity calculation logic 274 to determine how much more data the source port 260 can send to the receive buffer 270, based either on time or on the amount of data sent over an interval of time (i.e., data already on the link between the two network devices, this may also include data in the transmission buffer, etc.). The source port 260 will stop within the fixed quanta for ceasing data transmission, as set forth in the current Ethernet standard, but the capacity logic 274 provides an ability to send out additional information within that fixed quanta when the source port 260 determines that there is additional room in the receive buffer 270 that can be utilized while still complying with the Ethernet standard.

The following description provides for how a network device (in this example, a network switch capable of receiving/transmitting information over a network link) can make more efficient use of a receive buffer on a particular link partner (that is, another network device capable of receiving/transmitting information over the network link such as, without limitation, a server, a peripheral, an input/output subsystem, a bridge, a hub, a router, or another switch) such that the transmitting network device understands its data transmission history (i.e., how much data it has already transmitted over the network link to that particular link partner) and how much data remains to be transmitted to that particular link partner. This uses the transmission pause state more efficiently as the source port of the transmitting network device is able to if conditions allow, selectively delay ceasing transmission to a receiving network device after receiving a pause frame from the destination port of the receiving network device. The transmitting network device does not delay ceasing transmission beyond the fixed quanta set forth in the IEEE Ethernet standard.

Figure 3:
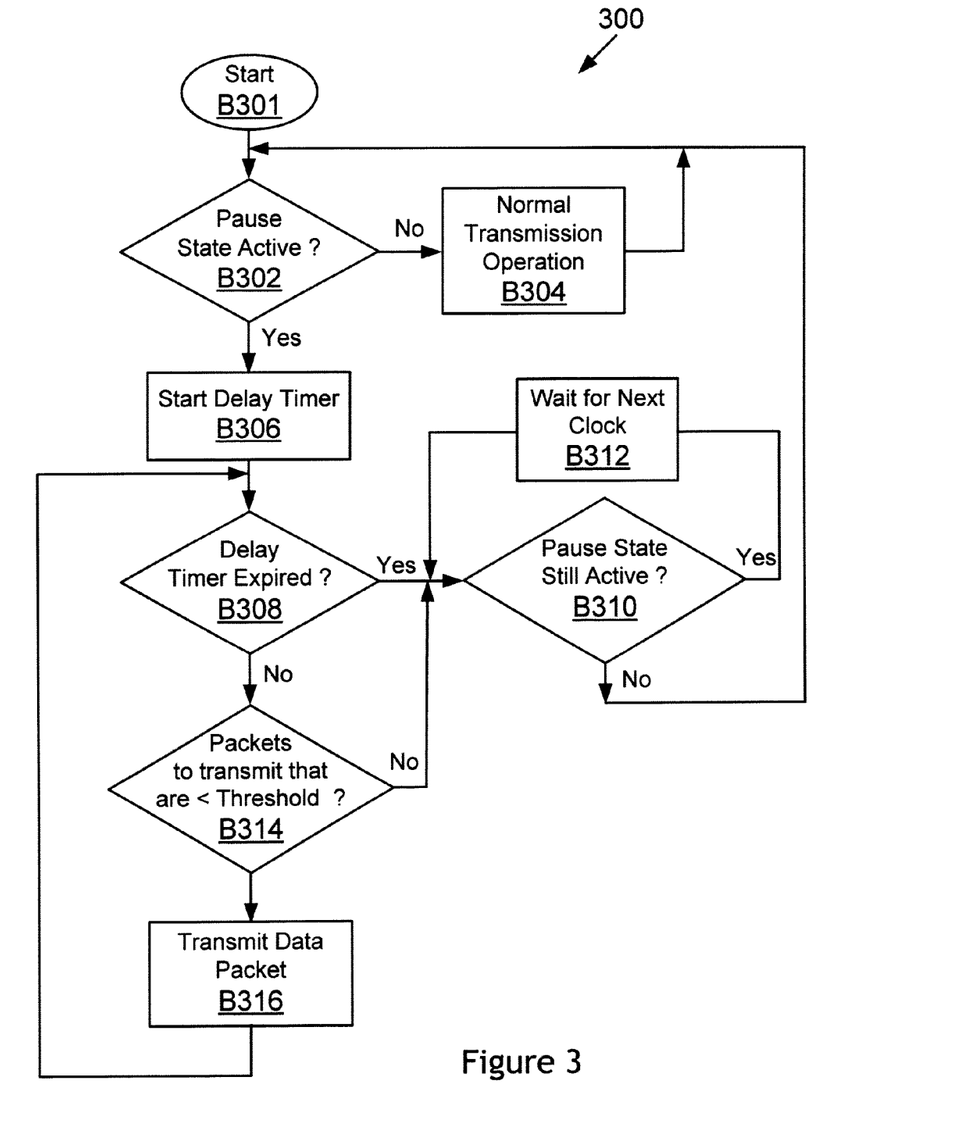
FIG. 3 shows a process flow diagram, according to an embodiment.

FIG. 3 shows a process 300, according to one embodiment where a delay by a source port 260 before pausing transmission is based on time remaining before transmission pause occurs in compliance with the IEEE Ethernet standard. The process steps may be executed by MAC 242 (i.e. shared MAC 214) in the transmit path of a port that is transmitting information at any given time. The process begins in block B301. In block B302, the process determines if a pause state is active (i.e., destination port 262 of a receiving network device has sent a pause frame to the source port 260 of a transmitting network device). This may be determined by monitoring the pause state active indicator 268 (FIG. 2C). If the pause state is not active, then in block B304, normal transmission continues and the process loops back to block B302. However, if the pause state is active, then in block B306, a delay timer is started. The delay timer may be located at MAC 242 or any other location at the transmitting port. The delay timer measures how much time remains to send additional data to the destination port within the fixed quanta set forth in the IEEE Ethernet standard. Then, in block B308, the process determines if the delay timer has expired. If the process determines that the delay timer has expired, in block B310, the process determines if the pause state is still active. If the pause state is still active, in block B312, the process waits for the next clock cycle, and then loops back to block B310. If the pause state is still active, the process proceeds to block B312 and again waits for the next clock cycle before looping back to block B310. The process repeats for as long as the pause state is still active. If the process determines in block B310 that the pause state is not active, the process then loops back to block B302.

In block B308, if the process determines that the delay timer has not expired, the process then determines in block B314 if there are one or more data packets that are waiting to be sent to the destination port of the receiving network device and that the one or more packets are less than the threshold capacity of the receive buffer of the destination port (i.e., sending one or more of the packets would not cause the destination port receive buffer to overflow). The threshold capacity may be a programmable value.

If process determines that one or more packets are less than the threshold size of the receive buffer, the data packets are transmitted in block B316 and the process loops back to block B308 until the delay timer has expired and the process proceeds as described above in blocks B310-B312, depending on whether or not the pause state is active.

If process in block B314 determines that the one or more packets are equal to or exceed the threshold of the receive buffer, the process proceeds to block B310 where the process determines if the pause state is still active, and the process proceeds as described above in blocks B310-B316, depending on whether or not the packets to transmit have reached or exceeded a threshold value.

Figure 4:
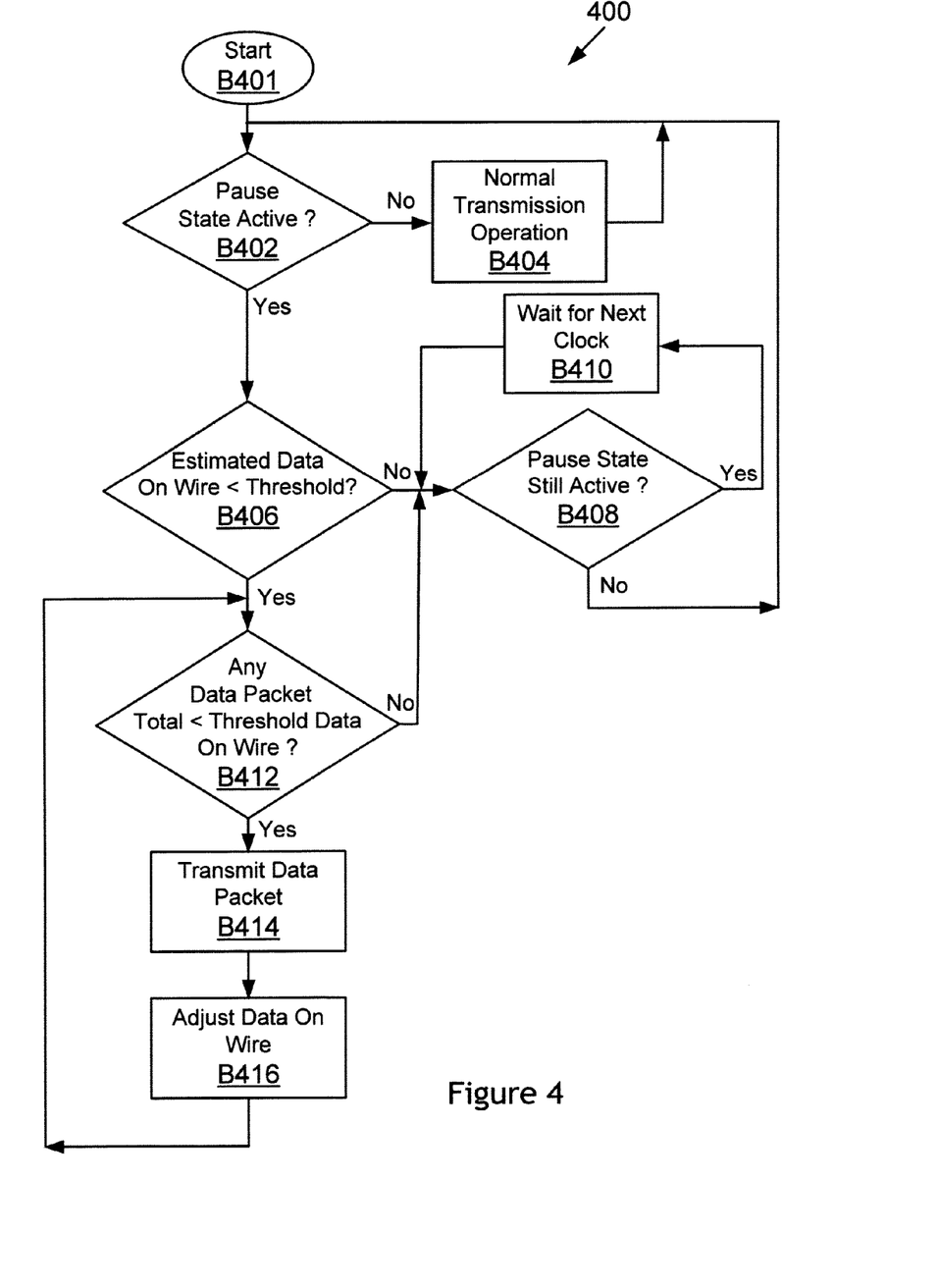
FIG. 4 shows a process flow diagram, according to another embodiment.

FIG. 4 shows a process 400, according to one embodiment where a delay by source port 260 before pausing transmission is based on amount of data that has been sent and amount of data remaining that can be sent before transmission pause occurs in compliance with the IEEE Ethernet standards. The process begins in block B401. In block B402, the process determines if a pause state is active (i.e., the receiving network device port 270 has sent a pause frame (266, FIG. 2C) to the transmitting network device). If the pause state is not active, then in block B404, normal transmission continues and the process loops back to block B402 where the process will continue in this manner until the pause state is active.

If the pause state is active, then in block B406, the process estimates if the amount of data already on the link (or wire) between the transmitting and receiving network devices is less than threshold of the receive buffer. This threshold is computed by measuring the amount of data that could have been sent over the last time interval. The time interval is the response time of the transmitter defined in a Quanta in the IEEE Ethernet standards. If the data already on the link is not less than threshold (i.e., the data on the link is equal to or exceeds threshold), then in block B408, the process determines if the pause state is still active. If the pause state is still active, in block B410, the process waits for the next clock cycle, and then loops back to block B408. If the process determines in block B408 that the pause state is not active, the process then loops back to block B402.

In block B406, if the process estimates that the amount of data already on the link between the transmitting and receiving network devices is less than a threshold value, then in block B412 the process determines if there is a data packet still waiting to be sent to the receive buffer (PBUF 204) of the receiving port 262 and if that data packet added to the amount of data already on the wire totals to less than the threshold amount of data that can still be transmitted on the link to the receive buffer (i.e., any one data packet waiting to be transmitted added to the amount of data already on the link that would not cause the receive buffer to overflow). If the process determines that the data packet still waiting to be transmitted would be less than the threshold of the receive buffer when combined with the amount of data already on the link between the network devices, the data packet is transmitted in block B414 and, in block B416, the process adjusts its tally of the amount of data on the link between the network devices and then the process loops back to block B412.

In block B412 if the process determines that a particular data packet waiting to be sent to the receive buffer of the receiving network device would equal or exceed the threshold amount when combined with the amount of data already on the link to the receiving network device, the process moves to block B408 that has been described above.

The embodiments disclosed herein have various advantages. For example, the same set of logic can be used to send additional information in various circumstances where pause states can occur. Furthermore, the embodiments described above are not limited to use in network switches but can be used in various network devices. The embodiments disclosed herein use the pause states more efficiently when there is time and/or capacity for additional information to be transmitted between network devices within the fixed quanta set by the Ethernet standard for ceasing data transmission after receipt of a pause state.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, although the embodiments disclosed above are for a switch element, the embodiments may be used in adapters, routers and other network device types. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A method for maximizing data transmission between a first network device connected to a second network device, comprising:
   receiving a pause request packet from a port of the first network device at a port of the second network device;
   determining if the port of the first network device can receive additional data; and
   delaying transmission pause and transmitting additional data to the first network device from the second network device if the port of the first network device can receive additional data.

2. The method of claim 1, wherein delaying transmission pause and transmitting additional data further comprises: transmitting data from the port of the second network device to the port of the first network device before the second network device has to stop transmitting data.

3. The method of claim 1, wherein determining if the port of the first network device can receive additional data further comprises:
   determining how much data was on a link between the first network device and the second network device when the pause request packet was received by the second network device; and
   determining remaining capacity of a receive buffer of the port of the first network device.

4. The method of claim 1, further comprising:
   determining if data remains to be transmitted from the second network device to the first network device; and
   transmitting only as much data from the second network device to the first network device as will not overflow a receive buffer of the port of the first network device.

5. The method of claim 1, further comprising:
   determining if data remains to be transmitted from the second network device to the first network device; and
   transmitting only as much data from the second network device to the first network device as can be sent within a period of time before the second network device has to stop transmitting data.

6. The method of claim 1, wherein the first network device is an adapter and the second network device is a switch element.

7. A system for maximizing data transmission on a network link, comprising:
   a first network device coupled to a network via the network link; and
   a second network device coupled to the network;
   wherein the second network device receives a pause request packet from the first network device and determines if the first network device can receive additional data within a fixed quanta, based on a determination of remaining capacity in a receive buffer of the first network device, and wherein the second network device implements the transmission pause request within the fixed quanta but transmits additional data to the first network device when there is remaining capacity in the receive buffer.

8. The system of claim 7, wherein the second network device includes a delay timer providing how much time remains to transmit data to the first network device before the second network device has to stop transmitting data.

9. The system of claim 7, wherein the second network device determines how much data already sent to the first network device has yet to be received by the first network device.

10. The system of claim 7, wherein the second network device determines how much data remains in a transmit buffer to be sent to the first network device, how much data remaining in the transmit buffer can be received by the first network device within the fixed quanta, and how much of the data remaining in the transmit buffer can be sent without exceeding remaining capacity in the receive buffer.

11. The system of claim 7, wherein the first network device is an adapter and the second network device is a switch element.

12. A network device for maximizing data transmission coupled to a network via a network link, comprising:
a processor for executing firmware code; and
a port for receiving and transmitting frames;
wherein the network device receives a pause request packet from a destination network device and determines if the destination network device can receive additional data within a fixed quanta, based on a determination of remaining capacity in a receive buffer of the destination network device and wherein the source network device implements the transmission pause request within the fixed quanta but transmits additional data to the destination network device when there is remaining capacity in the receive buffer.

13. The network device of claim 12, where the network device includes a delay timer providing how much time remains to transmit data to the destination network device before the source network device has to stop transmitting data.

14. The network device of claim 12, wherein the network device determines how much data already sent to the destination network device has yet to be received by the destination network device.

15. The network device of claim 12, wherein the source network device determines how much data remains in a transmit buffer to be sent to the destination network device, how much data remaining to be transmitted can be received by the destination network device within the fixed quanta, and how much of the data remaining in the transmit buffer can be sent without exceeding remaining capacity in the receive buffer.

16. The network device of claim 12, wherein the network device comprises a switch element.

17. The network device of claim 12, wherein the port includes a plurality of sub-ports configured to operate independently for sending and receiving information at a plurality of rates complying with a plurality of protocols.

18. The network device of claim 17, wherein one of the plurality of sub-ports is configured to operate as a Fibre Channel port.

19. The network device of claim 17, wherein one of the plurality of sub-ports is configured to operate as an Ethernet or Fibre Channel over Ethernet port.

\* \* \* \* \*

UNITED STATES PATENT AND TRADEMARK OFFICE
CERTIFICATE OF CORRECTION

| | | |
|---|---|---|
| PATENT NO. | : 8,976,667 B1 | Page 1 of 1 |
| APPLICATION NO. | : 13/678145 | |
| DATED | : March 10, 2015 | |
| INVENTOR(S) | : Frank R. Dropps | |

It is certified that error appears in the above-identified patent and that said Letters Patent is hereby corrected as shown below:

On the Title Page, Item (74), delete "Klein, O'Neil & Singh, LLP" and insert -- Klein, O'Neill & Singh, LLP --, therefor.

In the Specification

In column 2, line 41, delete "logic." and insert -- logic, --, therefor.

In column 10, line 9, delete "able to" and insert -- able to, --, therefor.

Signed and Sealed this
Twenty-first Day of July, 2015

Michelle K. Lee
*Director of the United States Patent and Trademark Office*